R. W. BENEDICT.
Shaft-Couplings.

No. 133,620.  Patented Dec. 3, 1872.

Witnesses.
Archie Baird
N. C. Hastins

Inventor.
R. W. Benedict
per R. F. Osgood
Atty

UNITED STATES PATENT OFFICE.

RICHARD W. BENEDICT, OF PERRY, ASSIGNOR OF ONE-HALF HIS RIGHT TO ALFRED KENDALL, OF LIMA, NEW YORK.

IMPROVEMENT IN SHAFT-COUPLINGS.

Specification forming part of Letters Patent No. 133,620, dated December 3, 1872.

*To all whom it may concern:*

Be it known that I, RICHARD W. BENEDICT, of Perry, in the county of Wyoming and State of New York, have invented a certain Improvement in Shaft-Couplings, of which the following is a specification:

Nature of the Invention.

My improvement belongs to that class known as universal couplings, where the two parts of the shaft run at an angle to each other. The invention consists in the combination of an encircling shell or globe with half-circular bearings of the shaft, whereby the connection is made without the usual bolts or pins, as hereinafter described.

General Description.

Figure 1:
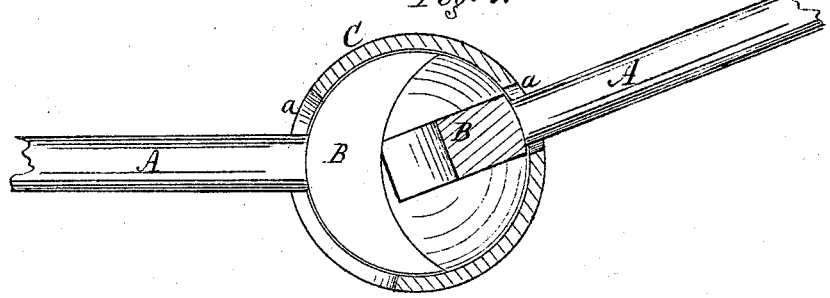
Figure 2:
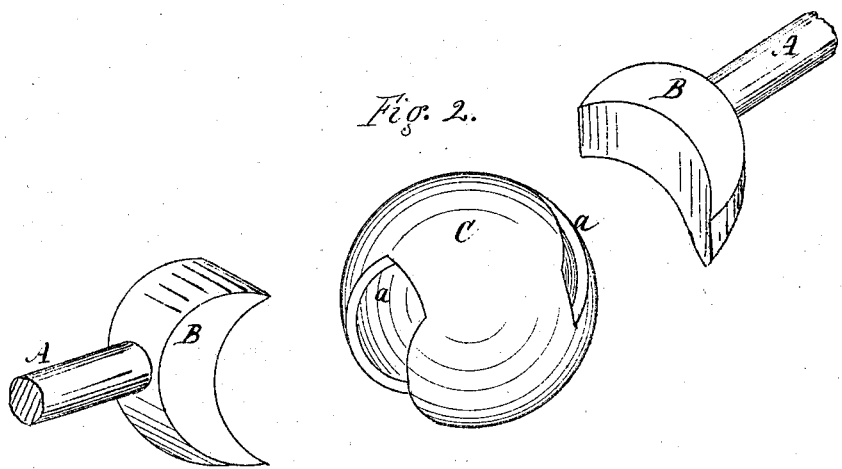
Figure 3:
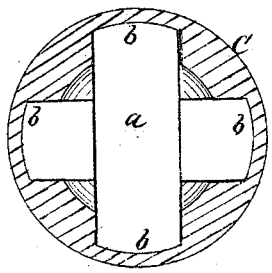

In the drawing, Figure 1 is a section of my improvement; Fig. 2, a perspective view of the parts separated; and Fig. 3, a section of the shell or globe, showing the ways or grooves in which the shaft-bearings rest.

A A represent the two parts of the shaft, which may run at an angle to each other, as shown in Fig. 1. These parts of the shaft have half-circular bearings B B, which form the coupling-heads. C is the hollow shell or globe. It has two slots or openings $a$ $a$ in its opposite sides, which stand at right angles to each other and are of sufficient size to admit the bearings B B by turning them at an angle, so that one end will enter first. When in place they cannot be withdrawn except when drawn clear to one side. The interior of the shell or globe has right-angled grooves or ways $b$ $b$, Fig. 3, in which the bearings rest and turn, and which prevent them from moving out of their right-angled path.

The advantages of this arrangement are as follows: First, the coupling is formed without any direct connection of the bearings B, each being distinct and independent of the other and having a free action. They are held only by the encircling shell or globe. In ordinary couplings of this kind the ends of the shaft are made forked and the forks are connected by cross-bolts. Such bolts give a degree of stiffness to the connection, and the action is not as free and unimpeded as in my case. Second, the ways $b$ $b$ secure the bearings in the proper right-angled position and retain them in place, so as to prevent any bending or unusual strain. Third, the shell or globe serves as a cover to inclose and shield the whole coupling. This prevents clogging of the coupling by any impediment and also obviates danger in passing the coupling. Fourth, the coupling is much cheaper, simpler, and more effective than the old form.

What I claim, and desire to secure by Letters Patent, is—

The combination of the hollow inclosing shell or globe C with the circular coupling heads or bearings B B, right-angled ways or grooves $b$ $b$, whereby a coupling is formed without a direct connection of said coupling-heads, as described.

In witness whereof I have hereunto signed my name in the presence of two subscribing witnesses.

RICHARD W. BENEDICT.

Witnesses:
F. J. BALLARD,
ROBERT STAINTON.